No. 624,661. Patented May 9, 1899.
R. R. LAY.
SCOOP AND FORK.
(Application filed Feb. 14, 1899.)
(No Model.)
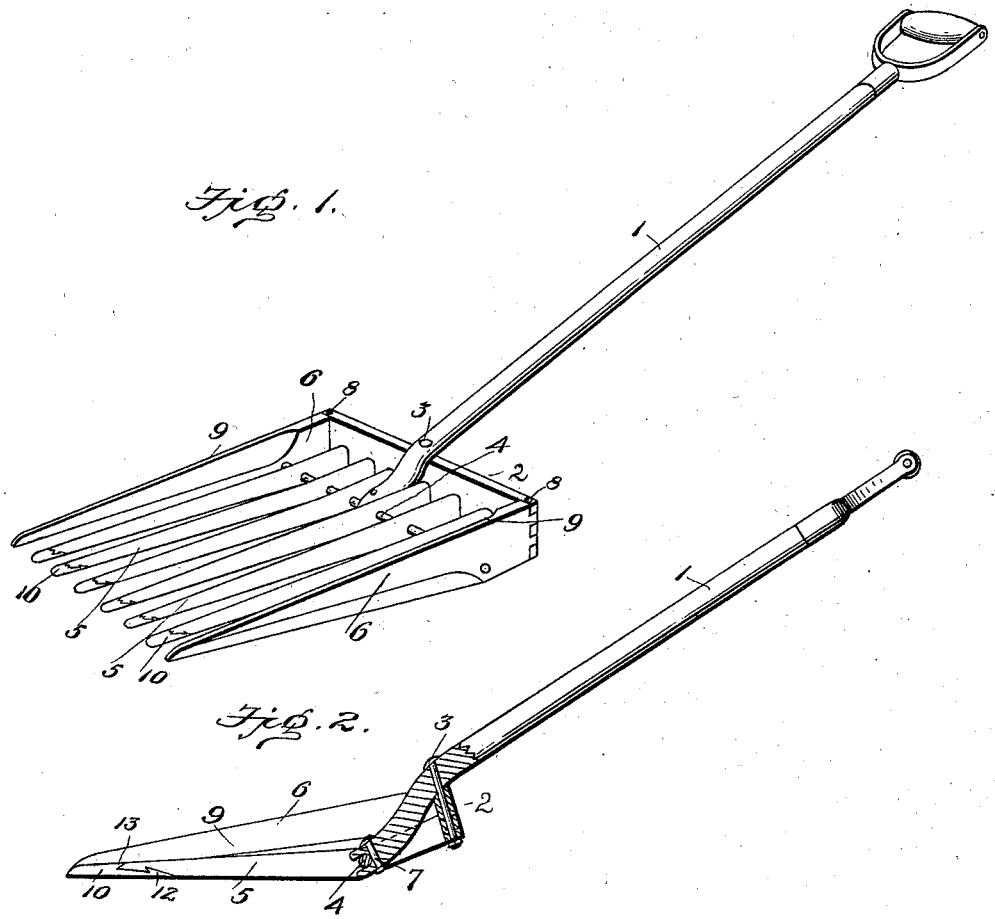
Inventor
Robert R. Lay
by H. B. Wilson & Co.
Attorneys
Witnesses

UNITED STATES PATENT OFFICE.

ROBERT R. LAY, OF ROCHESTER, NEW YORK.

SCOOP AND FORK.

SPECIFICATION forming part of Letters Patent No. 624,661, dated May 9, 1899.

Application filed February 14, 1899. Serial No. 705,508. (No model.)

*To all whom it may concern:*

Be it known that I, ROBERT R. LAY, a citizen of the United States, residing at Rochester, in the county of Monroe and State of New York, have invented certain new and useful Improvements in Scoops and Forks; and I do declare the following to be a full, clear, and exact description of the invention, such as will enable others skilled in the art to which it appertains to make and use the same.

My invention relates to improvements in scoops for handling vegetables, and more particularly to that class in which a scoop and fork are combined; and the object is to provide a simple, inexpensive, convenient, and durable device of this character.

To this end the invention consists in the construction, combination, and arrangement of the device, as will be hereinafter more fully described, and particularly pointed out in the claim.

In the accompanying drawings, Figure 1 is a perspective view of my improved scoop and fork. Fig. 2 is a longitudinal section through the handle. Fig. 3 is a detail section through one of the tines or fingers. Fig. 4 is a detail perspective view showing the metal guard detached from the end of the tine.

1 denotes the handle, the forward portion of which is secured to the head 2 of the scoop by the bolt 3, and its immediate end is bifurcated to encompass the transverse brace-rod 4, which extends through the tines or fingers 5 5 and the side guards 6 6. 7 denotes a bolt or rivet extending through the bifurcated end of the handle to form a bearing or brace for this rod 4 to rest against. The meeting ends of the head and side guards are dovetailed together, and a vertical rivet 8 passes through the intermeshing tenons, as shown, to form a rigid joint at this point. The upper inner walls of the side guards are chamfered outwardly at 9 9, as shown, and the lower outer walls are chamfered inwardly, as shown, to facilitate the separation of the scoop-load from the bulk. The rear ends of the tines are formed with a tenon which fits an alined orifice in the head to rigidly lock them in place, and the proper spacing of these tines is such that in handling potatoes and the like they may be commercially graded for market in the operation of filling them into bags or barrels, the smaller sizes passing between the tines, while the merchantable ones are retained in the scoop.

10 denotes the metal finger-guard, which is preferably made of aluminium or an aluminium alloy on account of its peculiar fitness for this purpose. This guard is formed with a forwardly-beveled tooth 12, which engages a correspondingly-formed notch or recess in the lower edge of the tine, and its forward edge terminates in a reversely-formed lug or tooth 13, which is turned backward to engage the beveled edge of the tine, and the inner face of this lug is grooved to encompass the reversely-formed end of the tine, and thereby rigidly secure the finger-guard in place.

In manipulating the scoop-fork practically the entire wear comes on the metallic finger-guard 10 10, and when these wear down to a point where the wooden tine is about to be exposed the worn guard is replaced by a new one, and in this manner the life and usefulness of the implement may be prolonged indefinitely.

The accompanying drawings show my invention in the best form now known to me; but many changes in the details might be made within the skill of a good mechanic without departing from the spirit of my invention as set forth in the claim at the end of this specification.

Having thus fully described my invention, what I claim as new, and desire to secure by Letters Patent of the United States, is—

In a scoop-fork, the combination with the dovetailed head and chamfered side guards, the parallel tines fixed in said head, the transverse brace connecting the tines and side guard, the handle secured to the head and transverse brace, and the metal guards fixed to the free ends of said tines, substantially as and for the purpose set forth.

In testimony whereof I have hereunto set my hand in presence of two subscribing witnesses.

ROBERT R. LAY.

Witnesses:
WILLIAM H. DRISCOLL,
NELLIE BASSETT.